United States Patent
Miyagawa et al.

(10) Patent No.: US 12,461,220 B2
(45) Date of Patent: Nov. 4, 2025

(54) RADAR SIGNAL PROCESSING DEVICE, RADAR DEVICE, RADAR SIGNAL PROCESSING METHOD, AND NON-TRANSITORY COMPUTER-READABLE MEDIUM

(71) Applicant: FURUNO ELECTRIC CO., LTD., Hyogo (JP)

(72) Inventors: Tetsuya Miyagawa, Hyogo (JP); Yoshifumi Ohnishi, Hyogo (JP)

(73) Assignee: FURUNO ELECTRIC CO., LTD., Hyogo (JP)

( * ) Notice: Subject to any disclaimer, the term of this patent is extended or adjusted under 35 U.S.C. 154(b) by 209 days.

(21) Appl. No.: 18/327,066

(22) Filed: Jun. 1, 2023

(65) Prior Publication Data

US 2023/0324536 A1 Oct. 12, 2023

Related U.S. Application Data

(63) Continuation of application No. PCT/JP2022/002374, filed on Jan. 24, 2022.

(30) Foreign Application Priority Data

Feb. 22, 2021 (JP) .................. 2021-025785

(51) Int. Cl.
*G01S 13/46* (2006.01)
*G01S 13/91* (2006.01)

(52) U.S. Cl.
CPC ............ *G01S 13/46* (2013.01); *G01S 13/917* (2019.05)

(58) Field of Classification Search
CPC ........ G01S 13/46; G01S 13/917; G01S 7/354; G01S 13/42; G01S 13/89; G01S 7/4004; G01S 13/937; G01S 7/414; Y02A 90/30
See application file for complete search history.

(56) References Cited

U.S. PATENT DOCUMENTS

2020/0042801 A1* 2/2020 Auner .................... G06V 20/58

FOREIGN PATENT DOCUMENTS

| CN | 112017432 | 12/2020 | |
|---|---|---|---|
| CN | 112017432 A | * 12/2020 | ............... G08G 1/01 |

(Continued)

OTHER PUBLICATIONS

"International Search Report (Form PCT/ISA/210) of PCT/JP2022/002374", mailed on Mar. 8, 2022, with English translation thereof, pp. 1-4.

(Continued)

*Primary Examiner* — Robert W Hodge
*Assistant Examiner* — Bongani Jabulani Mashele
(74) *Attorney, Agent, or Firm* — JCIPRNET

(57) ABSTRACT

A radar signal processing device includes: a shielding length calculating unit (61) which calculates, based on a reception signal received by an antenna that transmits and receives radio waves, a shielding length (L2), which is the horizontal length of a region where a transmission signal transmitted from the antenna is shielded by a shielding object (13) above a reference plane; and a vertical height calculating unit (62) which calculates, based on the shielding length and the positional relationship between the shielding object and the antenna, the height (H2) of the shielding object from the reference plane.

20 Claims, 9 Drawing Sheets

(56) References Cited

FOREIGN PATENT DOCUMENTS

| | | | |
|---|---|---|---|
| GB | 2093306 | | 8/1982 |
| JP | S4740519 | | 12/1972 |
| JP | H0991433 | | 4/1997 |
| JP | H10332334 | | 12/1998 |
| JP | 2008113314 A | * | 5/2008 |
| JP | 2009241902 | | 10/2009 |
| JP | 2014072681 | | 4/2014 |
| JP | 2017056758 | | 3/2017 |
| JP | 2018200176 | | 12/2018 |

OTHER PUBLICATIONS

"Search Report of Europe Counterpart Application", issued on Nov. 22, 2024, p. 1-p. 9.

* cited by examiner

RADAR SIGNAL PROCESSING DEVICE, RADAR DEVICE, RADAR SIGNAL PROCESSING METHOD, AND NON-TRANSITORY COMPUTER-READABLE MEDIUM

CROSS-REFERENCE TO RELATED APPLICATION

This application is a continuation of PCT International Application No. PCT/JP2022/002374, filed on Jan. 24, 2022, which claims priority under 35 U.S.C § 119(a) to Japanese Patent Application No. 2021-025785, filed on Feb. 22, 2021. Each of the above application(s) is hereby expressly incorporated by reference, in its entirety, into the present application.

BACKGROUND

Technical Field

The disclosure relates to a radar signal processing device, a radar device, a radar signal processing method, and a radar signal processing program.

Conventional Art

Conventionally, there is known a technology for grasping a state of waves on a water surface by grasping a water level or the like. For example, Patent Document 1 (Japanese Patent Laid-Open No. 2018-200176) discloses a water surface distance measuring instrument as follows. That is, the water surface distance measuring instrument provided on a hull side surface includes: a main body, arranged spaced apart from a water surface; and a tubular body, attached to a facing surface of the main body that faces the water surface and extending from the facing surface toward the water surface. The main body includes an antenna part that emits radio waves from the facing surface toward the water surface and receives the radio waves reflected on the water surface. The tubular body is arranged so as to surround the antenna part as viewed in an axial direction of the tubular body.

In the technology described in Patent Document 1, since the tubular body is arranged so as to surround the antenna part, the antenna part can be prevented from suffering the impact of waves and malfunctioning or being damaged.

However, since the antenna part in the water surface distance measuring instrument described in Patent Document 1 is provided to face the water surface in a position where there is a possibility of suffering the impact of waves, there remains a possibility that the antenna part may malfunction or be damaged due to the impact of waves.

SUMMARY

The purpose of the disclosure relates to a radar signal processing device, a radar device, a radar signal processing method, and a radar signal processing program in which a height of a target or the like can be calculated at low cost while the impact of waves is avoided.

A radar signal processing device according to an aspect of the disclosure includes: processing circuitry configured to: calculate a shielding length which is a horizontal length of a region where a transmission signal transmitted from an antenna is shielded by a shielding object above a reference plane based on a reception signal received by the antenna that transmits and receives radio waves; and calculate a height of the shielding object from the reference plane based on the shielding length and a positional relationship between the shielding object and the antenna.

In the radar signal processing device according to the above, the processing circuitry is further configured to: calculate the height of the shielding object from the reference plane using a height of the antenna from the shielding object and a horizontal length from the antenna to an end of the shielding object as the positional relationship.

In the radar signal processing device according to the above, the reference plane is a water surface.

In the radar signal processing device according to the above, the processing circuitry is further configured to: calculate an antenna height which is a height of the antenna from the water surface based on a sum of the height of the shielding object from the water surface and the height of the antenna from the shielding object.

In the radar signal processing device according to the above, the processing circuitry is further configured to: calculate a height of a target farther from the antenna than the shielding object from the water surface based on the antenna height, a distance between the antenna and the target, and a horizontal length of a region where the transmission signal is shielded by the target.

In the radar signal processing device according to the above, the antenna is configured to be mounted on a ship; the shielding object is a structure of the ship; and the processing circuitry is further configured to: calculate the height of the structure from the water surface.

In the radar signal processing device according to the above, the processing circuitry is further configured to: calculate draft of the ship based on a difference between the height of the structure from the water surface and a height of the structure from a bottom surface of the ship.

A radar device according to an aspect of the disclosure includes: the radar signal processing device according to the above; a transmitter configured to transmit the transmission signal with a radiation direction of the transmission signal oblique to the reference plane; and a receiver configured to receive the reception signal based on a reflection wave of the transmission signal.

In the radar device according to the above, the transmitter transmits the transmission signal having a particular beam width along the radiation direction in a plane perpendicular to the reference plane.

A radar signal processing method according to an aspect of the disclosure is used in a radar signal processing device and includes: calculating a shielding length which is a horizontal length of a region where a transmission signal transmitted from an antenna is shielded by a shielding object above a reference plane based on a reception signal received by the antenna that transmits and receives radio waves; and calculating a height of the shielding object from the reference plane based on the shielding length and a positional relationship between the shielding object and the antenna.

A non-transitory computer-readable medium according to an aspect of the disclosure stores a radar signal processing program used in a radar signal processing device, the radar signal processing program causing a computer to execute processing configured to: calculate shielding length which is a horizontal length of a region where a transmission signal transmitted from an antenna is shielded by a shielding object above a reference plane based on a reception signal received by the antenna that transmits and receives radio waves; and calculate a height of the shielding object from the reference plane based on the shielding length and a positional relationship between the shielding object and the antenna.

In this way, by the configuration of obtaining height information using the horizontal length of the region shielded by the shielding object, the antenna can be installed in a place away from the reference plane such as a water surface. Since there is no need to use a three-dimensional radar, an increase in cost can be suppressed. Accordingly, a height of a target or the like can be calculated at low cost while the impact of waves is avoided.

According to the disclosure, a height of a target or the like can be calculated at low cost while the impact of waves is avoided.

DETAILED DESCRIPTION

Figure 1:
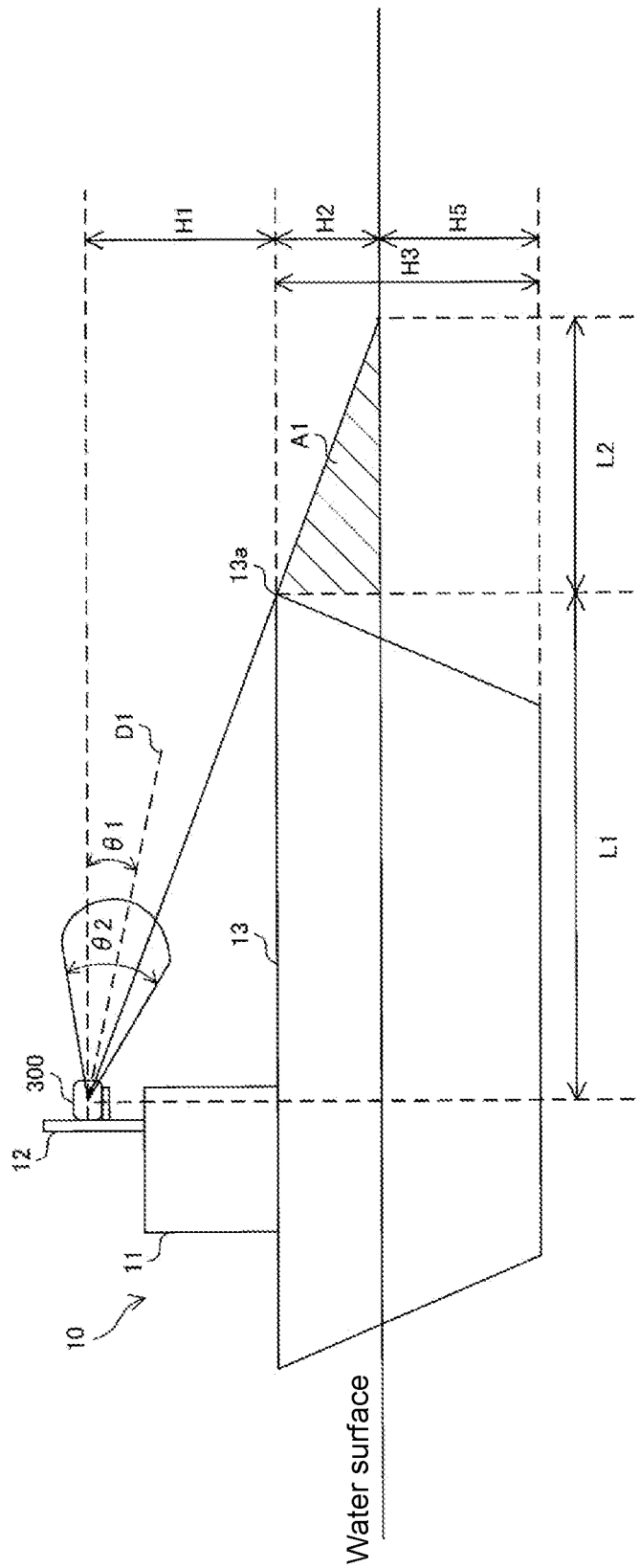
FIG. 1 illustrates an example of a state in which a radar device according to an embodiment of the disclosure is attached to a ship.

Hereinafter, embodiments of the disclosure will be described with reference to the drawings. The same or equivalent portions in the drawings are assigned with the same reference numerals and description thereof will not be repeated. In addition, at least some of the embodiments described below may be arbitrarily combined.

<Configuration and Basic Operation>

[Radar Device]

FIG. 1 illustrates an example of a state in which a radar device according to an embodiment of the disclosure is attached to a ship.

Referring to FIG. 1, a radar device 300 is mounted on, for example, a ship 10. More specifically, the radar device 300 is attached to, for example, a support 12 extending upward from a wheelhouse 11 of the ship 10. The radar device 300 is, for example, a radar device of a frequency modulated continuous wave (FM-CW) system.

The radar device 300 transmits a transmission signal to a detection target area being a region monitored by the ship 10, and receives, as a reception signal, a reflection signal of the transmission signal. Based on the reception signal, the radar device 300 performs processing configured to display on a display device (not illustrated) an echo image indicating the presence or absence of a target in the detection target area as well as a distance between the radar device 300 and the target.

A transmitting antenna 130 and a receiving antenna 140 described later in the radar device 300, which are examples of an antenna that transmits and receives radio waves, are attached so that a transmission signal is radiated obliquely to a water surface being an example of a reference plane. Specifically, an angle θ1 formed by a radiation direction of the transmission signal indicated by arrow D1 of FIG. 1 and the water surface is, for example, 10°.

The transmission signal has a particular vertical beam width θ2 along the radiation direction of the transmission signal in a plane perpendicular to the reference plane. For example, the radar device 300 transmits a fan beam having a vertical beam width θ2 of 25° and a horizontal beam width of 1.8° by using an antenna such as a slot antenna or a two-dimensional array antenna.

Figure 2:
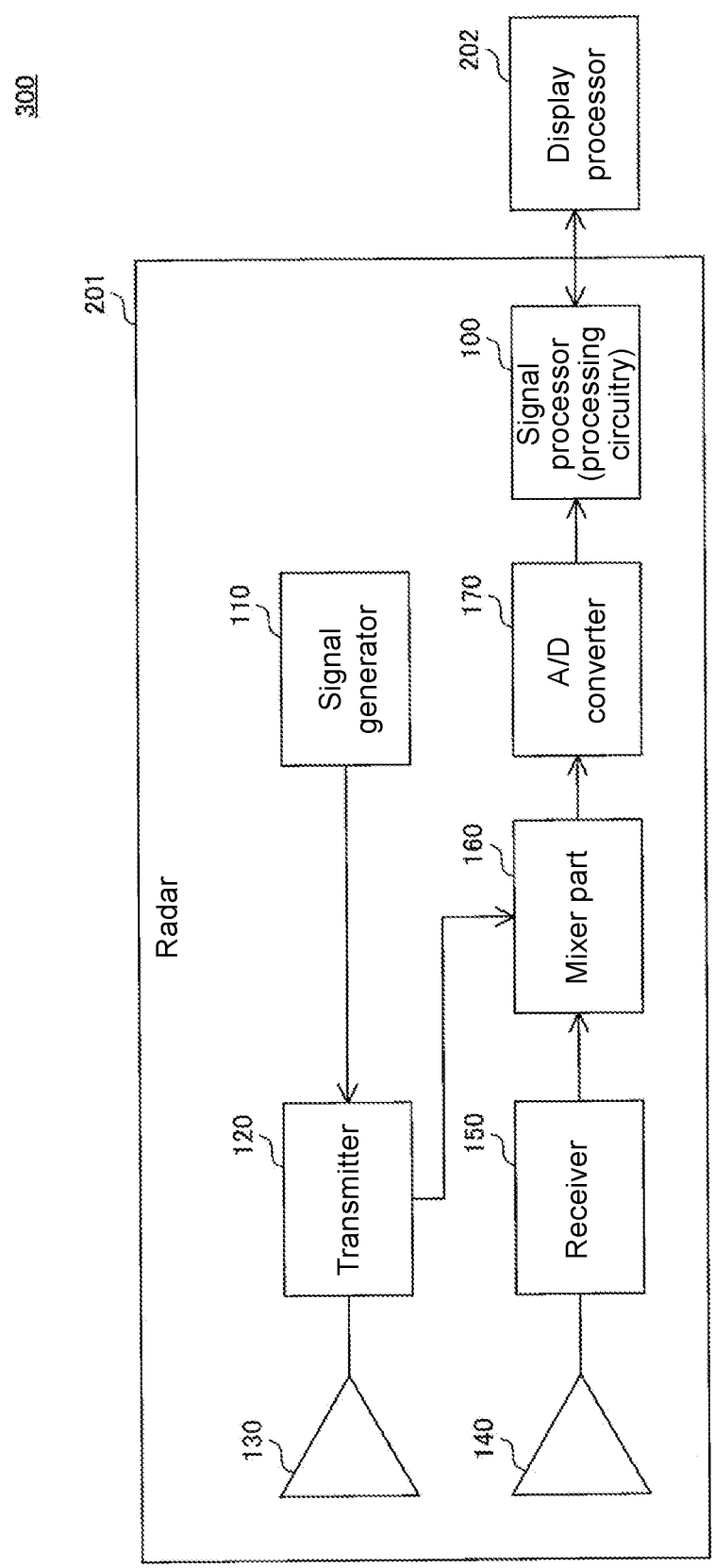
FIG. 2 illustrates a configuration of the radar device according to an embodiment of the disclosure.

FIG. 2 illustrates a configuration of the radar device according to an embodiment of the disclosure.

Referring to FIG. 2, the radar device 300 includes a radar 201 and a display processor 202. The radar 201 includes a signal generator 110, a transmitter 120, the transmitting antenna 130, the receiving antenna 140, a receiver 150, a mixer part 160, an analog to digital (A/D) converter 170, and a signal processor 100 (which is also referred to as a processing circuitry). The signal processor 100 is an example of a radar signal processing device. Hereinafter, each of the transmitting antenna 130 and the receiving antenna 140 is also simply referred to as an "antenna".

The radar 201 outputs, to the display processor 202, echo data indicating a detection result of the target in a divided target area being a region obtained by dividing the detection target area into a plurality of regions. The transmitting antenna 130 and the receiving antenna 140 rotate so that an azimuth angle in a radiation direction of the radio waves from the transmitting antenna 130 changes by a particular angle every particular sweep period T. Accordingly, the radar 201 is able to detect the target existing in all directions around the ship 10.

The radar 201 outputs, to the display processor 202, the echo data in a plurality of divided target areas for each sweep period T.

The display processor 202 performs processing configured to display the echo image in the detection target area on the display device based on a plurality of echo data received from the radar 201.

[Radar]

The signal generator 110 repeatedly generates an analog signal of a particular pattern and outputs the same to the transmitter 120. More specifically, in the sweep period T, the signal generator 110 outputs, to the transmitter 120, an analog signal generated by, for example, a modulation method of an FM-CW system and having a frequency increasing by a particular amount per unit time. Specifically, for example, the signal generator 110 includes a voltage generator and a voltage-controlled oscillator (VCO). In the sweep period T, the voltage generator generates an FM modulation voltage having a magnitude increasing at a constant rate and outputs the same to the VCO. The VCO generates an analog signal having a frequency corresponding to the magnitude of the FM modulation voltage received from the voltage generator and outputs the same to the transmitter 120.

The transmitter 120 transmits the transmission signal. More specifically, in the sweep period T, the transmitter 120 generates the transmission signal of a radio frequency (RF) band based on the analog signal received from the signal generator 110, and outputs the generated transmission signal of the RF band to the divided target area via the transmitting antenna 130 that rotates as the radar 201 rotates.

The transmitter 120 outputs the generated transmission signal of the RF band to the mixer part 160. Specifically, for example, the transmitter 120 includes a mixer and a power amplifier. The mixer generates the transmission signal of the RF band based on the analog signal received from the signal generator 110, and outputs the generated transmission signal to the power amplifier and the mixer part 160. In the transmitter 120, the power amplifier amplifies the transmission signal received from the mixer, and outputs the amplified transmission signal to the divided target area via the transmitting antenna 130.

The receiver 150 receives a reflection signal obtained by reflecting the transmission signal by the target. More specifically, the receiver 150 receives the reflection signal of the RF band via the receiving antenna 140 that rotates as the radar 201 rotates, in which the reflection signal of the RF band is a signal obtained by reflecting the transmission signal transmitted from the transmitting antenna 130 by the target in the divided target area. The receiver 150 outputs, to the mixer part 160, a reception signal which is a reflection signal received via the receiving antenna 140. Specifically, for example, the receiver 150 includes a low noise amplifier. The low noise amplifier amplifies the reception signal of the RF band received via the receiving antenna 140, and outputs the amplified reception signal to the mixer part 160.

The mixer part 160 generates a beat signal of the transmission signal transmitted from the radar device 300 and the reception signal received by the radar device 300. Here, the beat signal is a signal having a frequency component of a difference between a frequency component of the transmission signal transmitted by the transmitter 120 and a frequency component of the reception signal received by the receiver 150.

More specifically, the mixer part 160 includes, for example, two mixers. A branch part (not illustrated) branches the transmission signal output from the transmitter 120, applies a phase difference of 90° to the transmission signals obtained by branching, and outputs the same to each mixer in the mixer part 160. The branch part (not illustrated) branches the reception signal output from the receiver 150 and outputs the same to each mixer in the mixer part 160. The two mixers in the mixer part 160 respectively multiply the transmission signals and reception signals, thereby generating an analog beat signal SA composed of a pair of an I signal Si and a Q signal Sq and outputting the same to the A/D converter 170.

The A/D converter 170 converts the analog beat signal SA received from the mixer part 160 to a beat signal SD being a digital signal composed of a pair of the I signal Si and the Q signal Sq. More specifically, the A/D converter 170 performs sampling at a particular sampling frequency every sweep period T, thereby generating N beat signals SD composed of pairs of N I signals Si and N Q signals Sq and outputting the same to the signal processor 100. N is an integer equal to or greater than 2.

The signal processor 100 processes the N beat signals SD received from the A/D converter 170 in each sweep period T, thereby generating the echo data indicating the detection result of the target in the divided target area for each sweep period T. The signal processor 100 outputs the generated echo data to the display processor 202.

The radar device 300 may be configured to include, instead of the transmitting antenna 130 and the receiving antenna 140, one antenna that functions in the same manner as the transmitting antenna 130 and the receiving antenna 140, as the antenna that transmits and receives radio waves. In this case, for example, the transmitter 120 transmits the transmission signal to the transmitting antenna 130 via a circulator. For example, the receiver 150 receives the reception signal from the receiving antenna 140 via a circulator.

[Display Processor]

Based on the echo data for each divided target area received from the signal processor 100, the display processor 202 generates integrated data being the echo data in the detection target area. The display processor 202, for example, performs processing configured to adjust gain of the generated integrated data so that reflection by the target appears on the echo image, and to display the echo image in the detection target area on the display device (not illustrated) based on the integrated data after gain adjustment.

[Details of Signal Processor]

Figure 3:
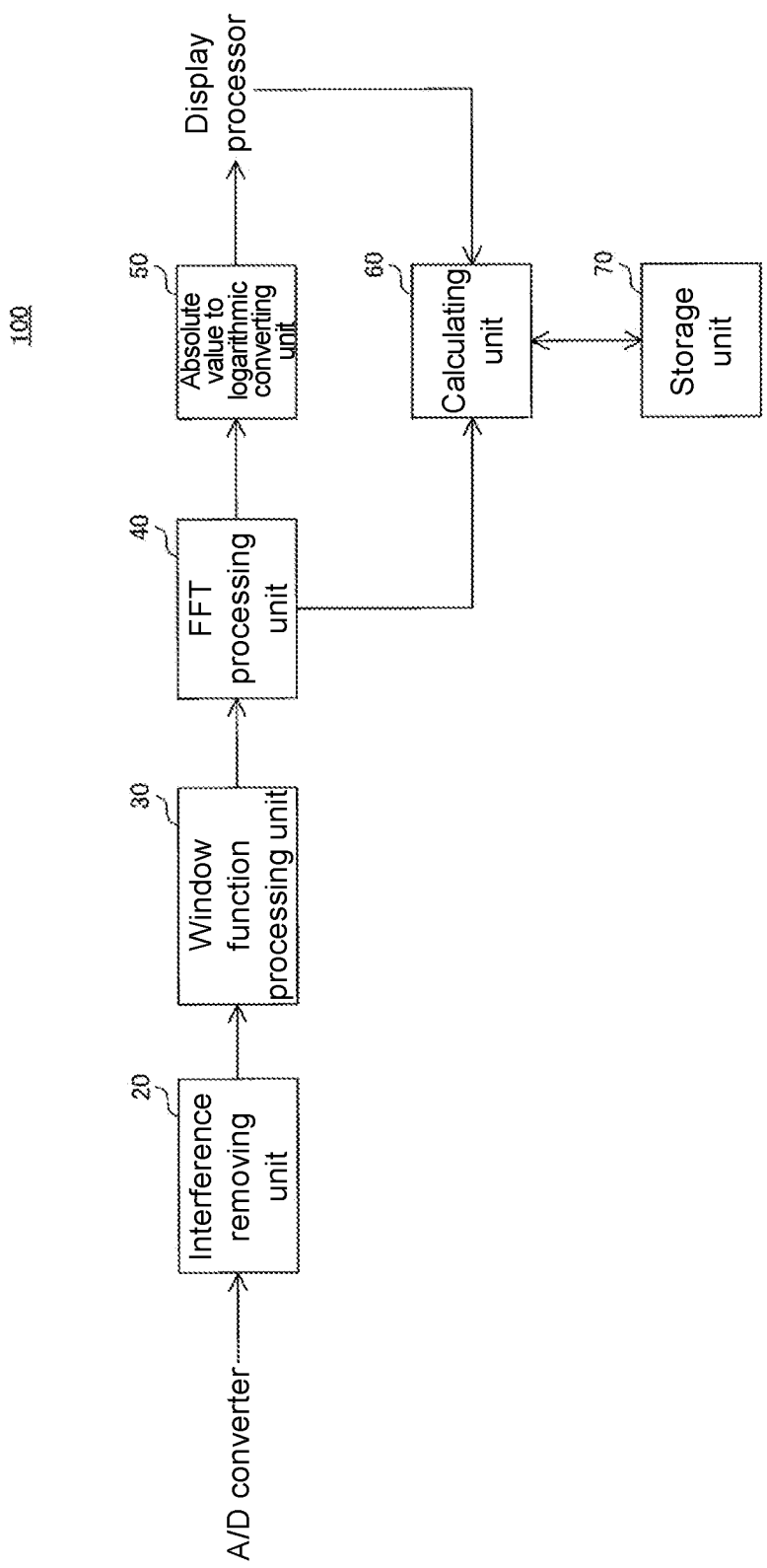
FIG. 3 illustrates a configuration of a signal processor in the radar device according to an embodiment of the disclosure.

FIG. 3 illustrates a configuration of a signal processor in the radar device according to an embodiment of the disclosure.

Referring to FIG. 3, the signal processor 100 includes an interference removing unit 20, a window function processing unit 30, an FFT processing unit 40, an absolute value to logarithmic converting unit 50, a calculating unit 60, and a storage unit 70.

The interference removing unit 20 receives N beat signals SD from the A/D converter 170, and performs FFT preprocessing configured to remove an interference component (a component based on an interference wave) from components of the received beat signals SD every sweep period T. The interference removing unit 20 outputs a beat signal SD from which the interference component has been removed by the FFT preprocessing to the window function processing unit 30.

The window function processing unit 30 performs window function processing configured to multiply the N beat signals SD after FFT preprocessing received from the interference removing unit 20 by a particular window function every sweep period T. The window function processing unit 30 outputs the beat signal SD after window function processing to the FFT processing unit 40.

The FFT processing unit 40 generates a power spectrum P by performing FFT processing on the N beat signals SD received from the window function processing unit 30, and outputs the generated power spectrum P to the absolute value to logarithmic converting unit 50 every sweep period T. For example, a frequency in the power spectrum P generated by the FFT processing unit 40 corresponds to the distance between the radar device 300 and the target.

The absolute value to logarithmic converting unit 50 generates the echo data by logarithmic transformation of a power spectrum PA indicating an absolute value of the power spectrum P received from the FFT processing unit 40, and outputs the generated echo data to the display processor 202.

The storage unit 70 holds dimension information indicating a length or height of each part of the ship 10. The dimension information indicates, for example, a length L1 in a horizontal direction between an end 13a of an upper deck 13 and an antenna in the radar device 300, in which the end 13a is in a plane that is perpendicular to the water surface illustrated in FIG. 1 and along the radiation direction of the transmission signal from the radar device 300. The dimension information indicates, for example, a height H1 of the antenna from the upper deck 13. The dimension information indicates, for example, a height H3 of the upper deck 13 from a bottom surface of the ship 10.

Based on the echo image displayed by the display processor 202 and the dimension information stored in the storage unit 70, the calculating unit 60 calculates draft of the ship 10 and a height or the like of the target existing around the ship 10. Details of a configuration of the calculating unit 60 are described below.

[Details of Calculating Unit]

Figure 4:
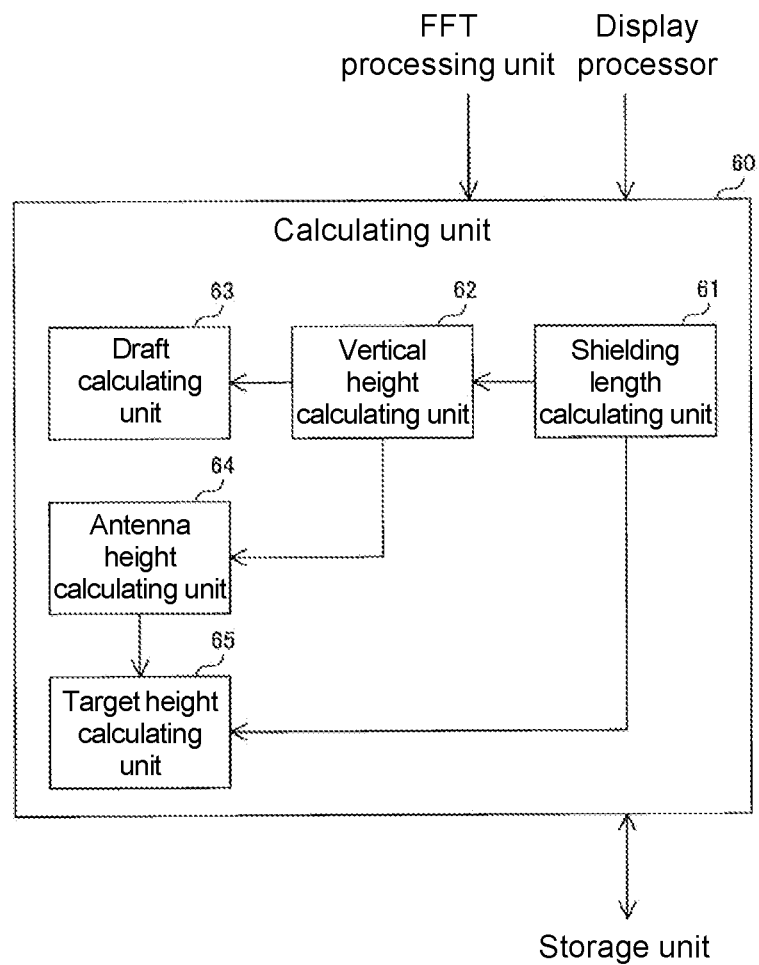
FIG. 4 illustrates a configuration of a calculating unit in the signal processor according to an embodiment of the disclosure.

FIG. 4 illustrates a configuration of a calculating unit in the signal processor according to an embodiment of the disclosure.

Referring to FIG. 4, the calculating unit 60 includes a shielding length calculating unit 61, a vertical height calculating unit 62, a draft calculating unit 63, an antenna height calculating unit 64, and a target height calculating unit 65.

(Calculation of Draft)

Referring to FIG. 1 and FIG. 4, based on the reception signal received by the antenna in the radar device 300, the shielding length calculating unit 61 calculates a shielding length L2 which is a horizontal length of a region where the transmission signal is shielded by a shielding object above the reference plane. Here, it is assumed that the reference plane is the water surface. It is assumed that the shielding object is a structure of the ship 10, specifically, the upper deck 13 of the ship 10.

That is, as illustrated in FIG. 1, in the case where the transmission signal output from the transmitter 120 in the radar device 300 via the transmitting antenna 130 is partially blocked by the upper deck 13 of the ship 10, there is an area where the transmission signal does not reach in a portion of the water surface in the detection target area. In this way, the area where the transmission signal does not reach due to the shielding object is referred to as a shadow area A1.

Based on, for example, the echo image of the detection target area displayed by the display processor 202, the shielding length calculating unit 61 calculates the shielding length L2 which is the horizontal length of the shadow area A1 shielded by the upper deck 13.

Figure 5:
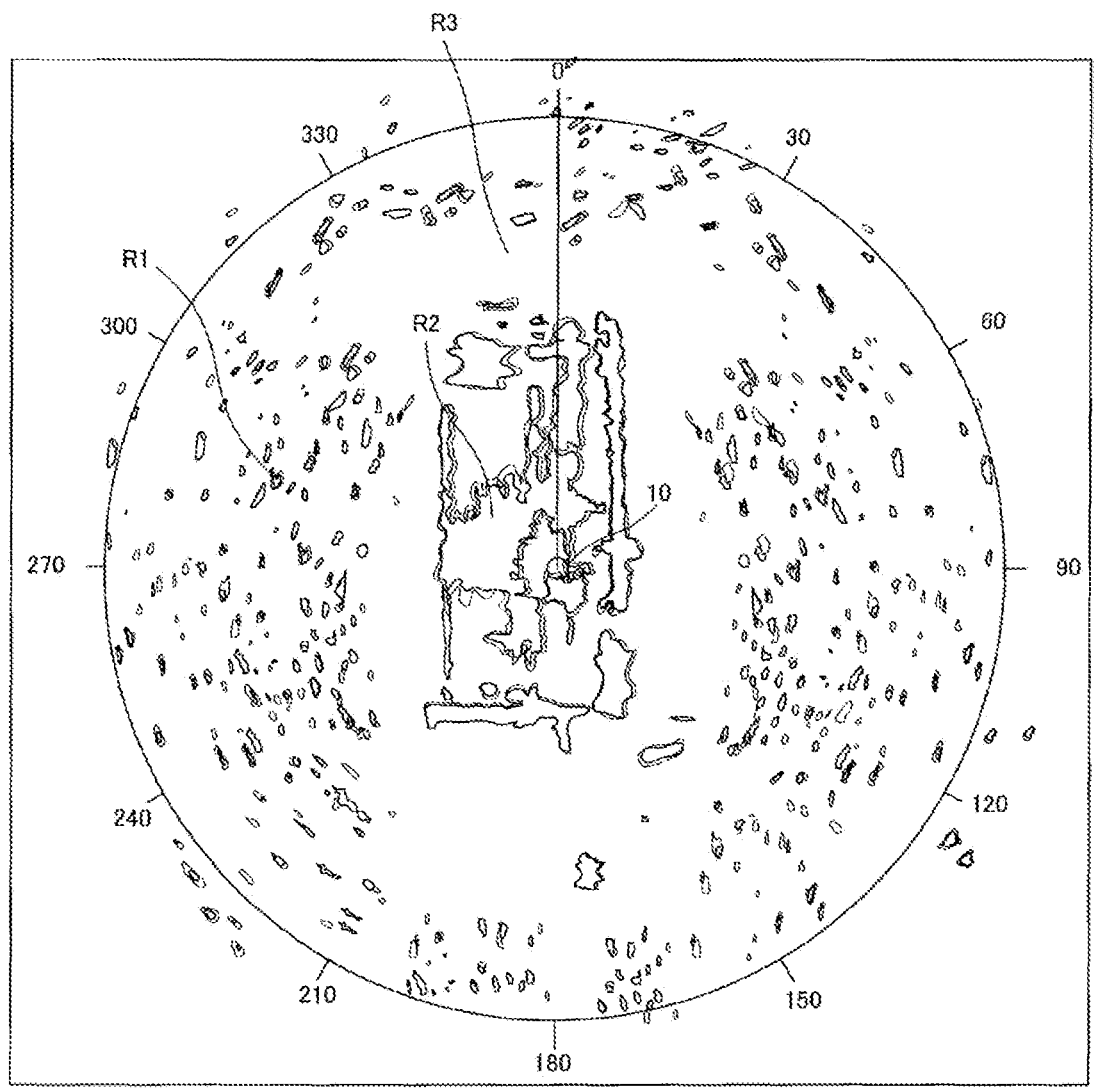
FIG. 5 illustrates an example of an echo image displayed by a display processor according to an embodiment of the disclosure.

FIG. 5 illustrates an example of an echo image displayed by a display processor according to an embodiment of the disclosure.

Referring to FIG. 5, in the echo image displayed by the display processor 202, for example, a color tone is displayed corresponding to a strength of a reflection signal transmitted from the target existing in the detection target area centered on the ship 10. For example, in the echo image, a place where the target being a source of the reflection signal exists is displayed in a color corresponding to the strength of the reflection signal.

For example, in the echo image, an area R1 where a plurality of small regions are scattered is an area where sea surface reflection occurs on the water surface, which is an example of the target. For example, in the echo image, an area R2 where the strength of the reflection signal around the ship 10 is high is an area where the upper deck 13 of the ship 10 exists. For example, in the echo image, an area R3 where no reflection of the transmission signal occurs is a shadow area where the transmission signal does not reach, specifically, the shadow area A1 shielded by the upper deck 13.

The shielding length calculating unit 61 identifies the area R3 by, for example, determining brightness of the echo image, and calculates a horizontal length of the identified area R3. The shielding length calculating unit 61 notifies the vertical height calculating unit 62 of the calculated length as the shielding length L2.

The shielding length calculating unit 61 may calculate the length of the shielding length L2 using a learning model for determining the shadow area A1 from the echo image. The shielding length calculating unit 61 is able to, for example, input image information indicating the echo image displayed by the display processor 202 to the learning model, and, based on a determination result as to the shadow area A1 output from the learning model, calculate the shielding length L2 of the shadow area A1.

Referring again to FIG. 1 and FIG. 4, based on the shielding length L2 calculated by the shielding length calculating unit 61 and a positional relationship between the shielding object and the antenna, the vertical height calculating unit 62 calculates a height H2 of the shielding object from the reference plane.

More specifically, the positional relationship between the upper deck 13 as the shielding object and the antenna is known, and information indicating the positional relationship is stored as the dimension information in the storage unit 70. That is, the vertical height calculating unit 62 calculates the height H2 of the shielding object from the reference plane, that is, the freeboard H2 being a height of the upper deck 13 from the water surface, in accordance with the following equation (1), using the length L1 and the height H1 indicated by the dimension information stored in the storage unit 70 as the positional relationship. The vertical height calculating unit 62, for example, notifies the draft calculating unit 63 and the antenna height calculating unit 64 of the calculated height H2.

$$H2 = L2/L1 \times H1 \quad (1)$$

Based on a difference between the height H2 of the upper deck 13 from the water surface calculated by the vertical height calculating unit 62 and the height H3 indicated by the dimension information stored in the storage unit 70, the draft calculating unit 63 calculates draft H5 of the ship 10 in accordance with the following equation (2). The draft calculating unit 63 stores the calculated draft H5 in, for example, the storage unit 70.

$$H5 = H3 - H2 \quad (2)$$

The vertical height calculating unit 62 may calculate the height H2 of the shielding object from the reference plane using, instead of the length L1 in the horizontal direction between the end 13a of the upper deck 13 and the antenna as well as the height H1 of the antenna from the upper deck 13, another length or height indicating the positional relationship between the shielding object and the antenna.

(Calculation of Height of Target)

Figure 6:
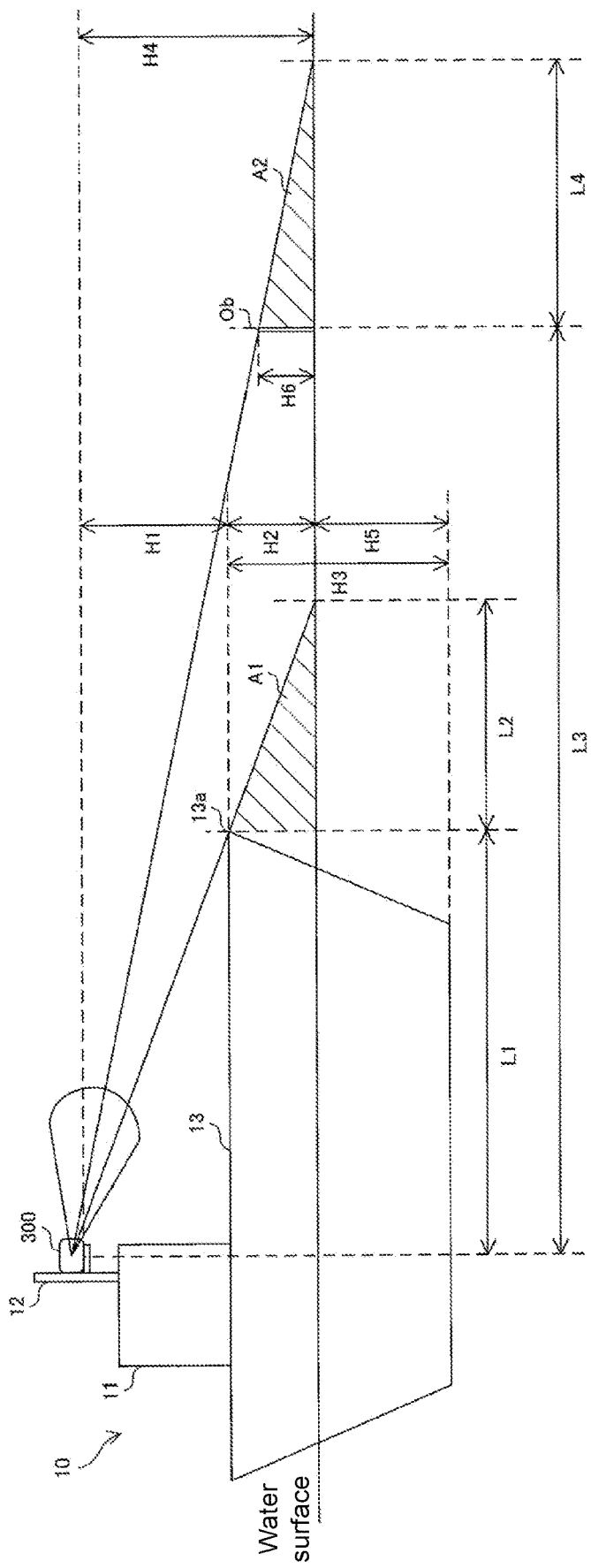
FIG. 6 is a diagram for describing a method for calculating a height of a target existing around the ship according to an embodiment of the disclosure.

FIG. 6 is a diagram for describing a method for calculating a height of a target existing around the ship according to an embodiment of the disclosure.

Referring to FIG. 6, for example, it is assumed that a target Ob exists on the sea around the ship 10. In this case, the calculating unit 60 in the radar device 300 calculates a height H6 of the target Ob from the water surface. The target Ob may be a fixed object such as land, or a floating object on the sea, or a wave.

More specifically, referring to FIG. 4 and FIG. 6, the shielding length calculating unit 61 in the calculating unit 60 calculates a shielding length LA which is a horizontal length of a shadow area A2 shielded by the target Ob, for example, based on the echo image. The shielding length calculating unit 61 calculates the shielding length LA using, for example, the same method as that for calculating the shielding length L2 described above. The shielding length calculating unit 61 notifies the target height calculating unit 65 of the calculated shielding length LA.

The shielding length calculating unit 61 calculates a distance L3 in the horizontal direction between the antenna in the radar device 300 and the target Ob, for example, based on the echo image. More specifically, the shielding length calculating unit 61, for example, identifies an area corresponding to the shadow area A2 in a region displayed in the echo image. Based on the echo image, the shielding length calculating unit 61 calculates a horizontal distance between the ship 10 and the identified area as the distance L3, and notifies the target height calculating unit 65 of the calculated distance L3.

The vertical height calculating unit 62 calculates the height H2 of the upper deck 13 from the water surface as described above, and, for example, notifies the draft calculating unit 63 and the antenna height calculating unit 64 of the calculated height H2.

Based on the height H2 of the upper deck 13 from the water surface calculated by the vertical height calculating unit 62 and the height H1 of the antenna from the upper deck 13 indicated by the dimension information stored in the storage unit 70, the draft calculating unit 64 calculates a height H4 of the antenna from the water surface.

That is, the antenna height calculating unit 64 calculates the height H4 of the antenna from the water surface in accordance with the following equation (3). The antenna height calculating unit 64 notifies the target height calculating unit 65 of the calculated height H4.

$$H4=H1+H2 \quad (3)$$

Based on the shielding length L4 and the distance L3 calculated by the shielding length calculating unit 61 and the height H4 calculated by the antenna height calculating unit 64, the target height calculating unit 65 calculates the height H6 of the target Ob from the water surface.

That is, the target height calculating unit 65 calculates the height H6 of the target Ob from the water surface in accordance with the following equation (4). The target height calculating unit 65 stores the calculated height H6 in, for example, the storage unit 70.

$$H6=L4/(L3+L4)\times H4 \quad (4)$$

The radar device 300 is not limited to being mounted on the ship 10, and may be attached to, for example a support stand or the like provided on land. In this case, for example, a quay being a boundary between the land and the water surface serves as the shielding object, blocking the transmission signal from reaching the water surface. The radar device 300 is able to calculate a height of the quay from the water surface.

The reference plane is not limited to the water surface, and may be, for example, land.

The radar signal processing device may be provided separately from the radar device 300. Specifically, the calculating unit 60 in the signal processor 100 illustrated in FIG. 3 may be provided as the radar signal processing device separately from the radar device 300. In this case, the signal processor 100 in the radar device 300 does not include the calculating unit 60.

The radar device 300 is not limited to employing the FM-CW system, and may employ, for example, a pulsed system. However, in the case of employing the pulsed system, resolution of a pulsed radar is determined by a pulse width. Since there is a limit to shortening the pulse width, there is a limit to increasing the resolution. On the other hand, in the case of employing the FM-CW system, since resolution is determined by a frequency bandwidth, it is easy to increase the resolution. Hence, the FM-CW system may be employed rather than the pulsed system.

The calculating unit 60 is not limited to a configuration of calculating both the draft H5 and the height H6 of the target existing around the ship 10. For example, the calculating unit 60 may be configured to not include the draft calculating unit 63. The calculating unit 60 may also be configured to not include the antenna height calculating unit 64 and the target height calculating unit 65.

[Modification 1]

The shielding length calculating unit 61 in the calculating unit 60 may be configured to calculate the shielding length L2 and the shielding length L4 using a method other than the method using the echo image. For example, the shielding length calculating unit 61 may calculate the shielding length L2 and the shielding length L4 based on the power spectrum P generated by the FFT processing unit 40 illustrated in FIG. 3.

Figure 7:
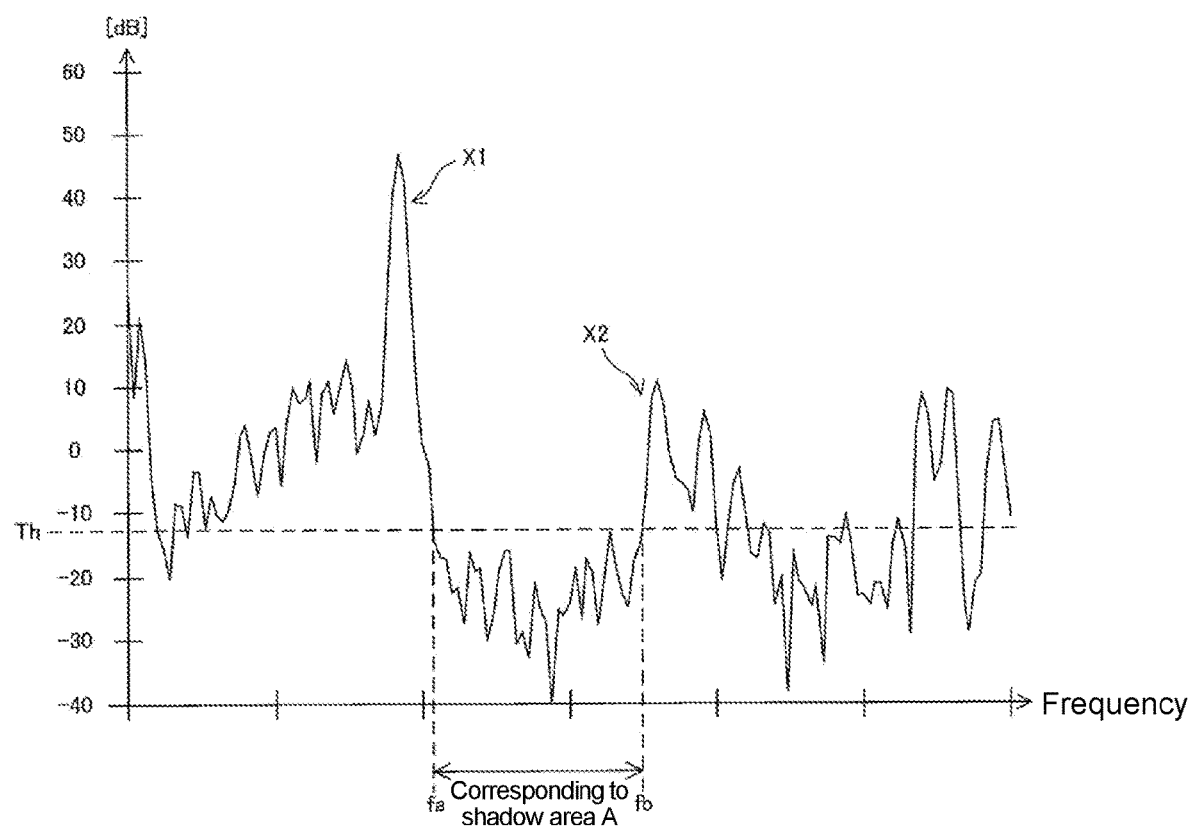
FIG. 7 illustrates an example of a power spectrum generated by an FFT processing unit in the signal processor according to an embodiment of the disclosure.

FIG. 7 illustrates an example of a power spectrum generated by an FFT processing unit in the signal processor according to an embodiment of the disclosure. In FIG. 7, the horizontal axis indicates frequency and the vertical axis indicates amplitude [dB].

Referring to FIG. 7, for example, in the case where a shadow area A exists around the ship 10, since no reflection of the transmission signal occurs in the shadow area A, the strength of a frequency corresponding to the shadow area A in the power spectrum P is reduced.

Hence, for example, if a portion exists in which the strength is lower than a threshold Th continuously over a particular span of frequency or more in the power spectrum P, the shielding length calculating unit 61 determines that the portion corresponds to the shadow area A. The shielding length calculating unit 61 identifies a minimum value fa and a maximum value fb of the frequency of the portion corresponding to the shadow area A, and, based on the identified minimum value fa and maximum value fb, calculates a horizontal length of the shadow area A, that is, the shielding length L2 or the shielding length L4.

In the graph illustrated in FIG. 7, a portion indicated by arrow X1 where the strength sharply decreases corresponds to, for example, a boundary between the shielding object and the shadow area A. In the graph illustrated in FIG. 7, a portion indicated by arrow X2 where the strength sharply increases corresponds to, for example, a boundary between the shadow area A and an area where sea surface reflection occurs.

[Modification 2]

The shielding length calculating unit 61 may, instead of calculating the shielding length L2 and the shielding length L4 based on one power spectrum P generated by the FFT processing unit 40, calculate the shielding length L2 and the shielding length L4 based on a plurality of power spectra P generated by the FFT processing unit 40.

More specifically, the transmitting antenna 130 and the receiving antenna 140 rotate so that the azimuth angle in the radiation direction of the radio waves from the transmitting antenna 130 changes by a particular angle every particular sweep period T, as described above. The FFT processing unit 40 in the signal processor 100 generates the power spectrum P, for example, every sweep period T.

The shielding length calculating unit 61 calculates the shielding length L2 and the shielding length L4 based on, for example, a particulate number K1 (K1 is a natural number equal to or greater than 2) of power spectra P continuously generated by the FFT processing unit 40. Specifically, the shielding length calculating unit 61, for example, calculates the shielding length L2 for each power spectrum P, and takes a minimum value of K1 shielding lengths L2 calculated as the shielding length L2.

In this way, by calculating the shielding length L2 and the shielding length L4 using a plurality of power spectra P, the shielding length calculating unit 61 is able to calculate the shielding length L2 and the shielding length L4 more accurately than in the case of using one power spectrum P.

[Modification 3]

The transmitting antenna 130 and the receiving antenna 140 rotate 360 degrees every scan period T2 while rotating by a particular angle each time.

The shielding length calculating unit 61 may calculate the shielding length L2 and the shielding length L4 based on, for example, a particular number K2 (K2 is a natural number equal to or greater than 2) of power spectra P being a plurality of power spectra P generated by the FFT processing unit 40 at each timing when the azimuth angle of the radiation direction of the radio waves from the transmitting antenna 130 becomes the same, that is, every scan period T2. Specifically, the shielding length calculating unit 61, for example, calculates the shielding length L2 for each power spectrum P, and takes a minimum value of K2 shielding lengths L2 calculated as the shielding length L2.

The shielding length calculating unit 61 does not necessarily take the minimum value of the K1 or K2 shielding lengths L2 as the shielding length L2, and may take, for example, an average value of the K1 or K2 shielding lengths L2 as the shielding length L2.

<Operation Flow>

A radar device according to an embodiment of the disclosure includes a computer including a memory. An arithmetic processing unit such as a CPU in the computer reads from the memory a program including some or all of steps of the following flowchart and sequence and executes the same. The program can be installed from the outside. The program is stored in a recording medium or distributed via a communication line.

[Calculation of Height of Shielding Object (Example 1)]

Figure 8:
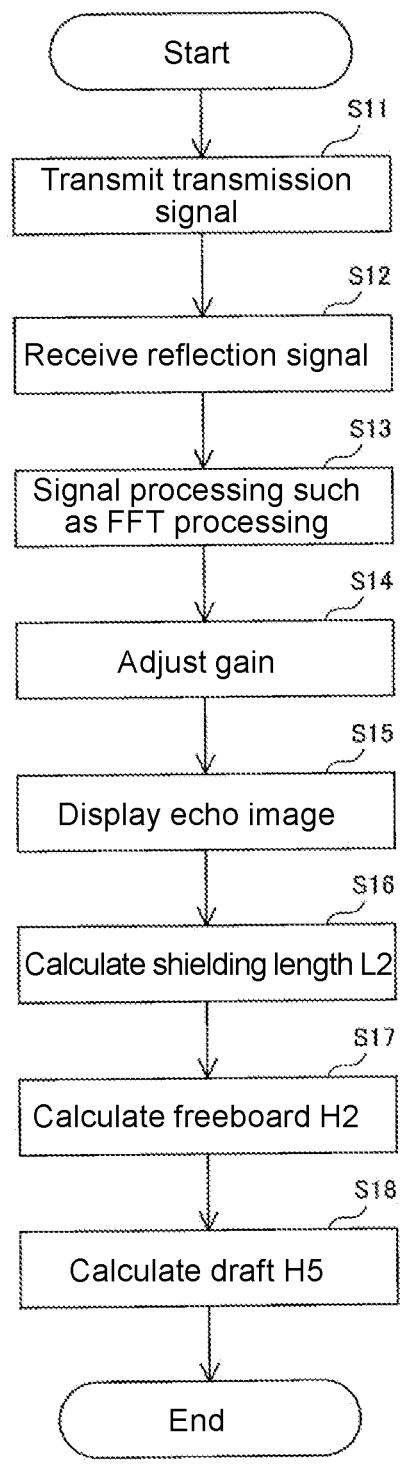
FIG. 8 is a flowchart defining an example of an operation procedure when the radar device according to an embodiment of the disclosure calculates a height of a shielding object from a reference plane.

FIG. 8 is a flowchart defining an example of an operation procedure when the radar device according to an embodiment of the disclosure calculates a height of a shielding object from a reference plane. Here, a case is described where the shielding length calculating unit 61 in the radar device 300 calculates the height H2 of the shielding object from the reference plane based on the echo image.

Referring to FIG. 8, first, the transmitter 120 transmits a transmission signal to a divided target area via the transmitting antenna 130 (step S11).

Next, the receiver 150 receives, as a reception signal, a reflection signal obtained by reflecting the transmission signal transmitted from the transmitter 120 by a target in the divided target area (step S12).

Next, the mixer part 160 generates a beat signal of the transmission signal transmitted from the transmitter 120 and the reception signal received by the receiver 150. The A/D converter 170 converts the beat signal generated by the mixer part 160 into a beat signal being a digital signal. The signal processor 100 generates the power spectrum P by performing FFT processing on the beat signal being a digital signal obtained by conversion by the A/D converter 170, performs signal processing on the generated power spectrum P and generates echo data (step S13).

Next, the display processor 202, for example, generates integrated data based on the echo data for each divided target area generated by the signal processor 100, and adjusts gain of the generated integrated data so that reflection by the target appears on an echo image (step S14).

Next, the display processor 202 performs processing configured to display the echo image in a detection target area on a display device based on the integrated data after gain adjustment (step S15).

Next, based on the reception signal received by the radar device 300, the shielding length calculating unit 61 of the calculating unit 60 in the signal processor 100 calculates a horizontal length of the shadow area A1 where the transmission signal is shielded by a shielding object above a reference plane, that is, the shielding length L2.

For example, the shielding length calculating unit 61 identifies the shadow area A1 in the detection target area by determining the brightness of the echo image displayed by the display processor 202, and calculates the horizontal length of the identified shadow area A1 as the shielding length L2 (step S16).

Next, based on the shielding length L2 calculated by the shielding length calculating unit 61 and a positional relationship between the shielding object and an antenna, the vertical height calculating unit 62 in the calculating unit 60 calculates the height H2 of the shielding object from the reference plane. Specifically, the vertical height calculating unit 62 calculates the height of the upper deck 13 from the water surface, that is, the freeboard H2, using the length L1 in the horizontal direction between the end 13a of the upper deck 13 and the antenna in the radar device 300 as well as the height H1 of the antenna from the upper deck 13 indicated by the dimension information stored in the storage unit 70 as the above positional relationship (step S17).

Next, based on a difference between the freeboard H2 calculated by the vertical height calculating unit 62 and the height H3 of the upper deck 13 from the bottom surface of the ship 10 indicated by the dimension information stored in the storage unit 70, the draft calculating unit 63 in the calculating unit 60 calculates the draft H5 of the ship 10. The draft calculating unit 63 stores the calculated draft H5 in, for example, the storage unit 70 (step S18).

[Calculation of Height of Shielding Object (Example 2)]

Figure 9:
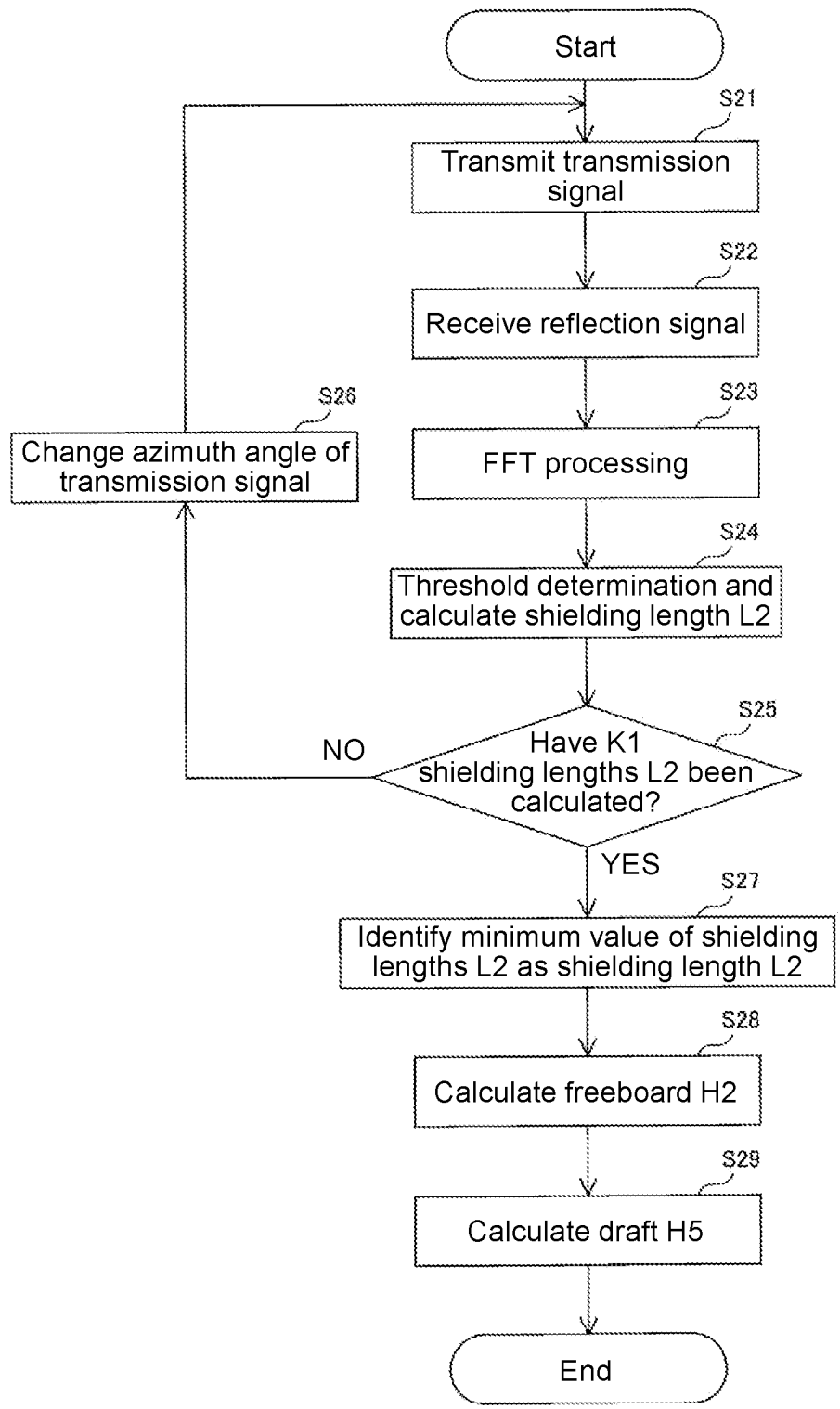
FIG. 9 is a flowchart defining another example of the operation procedure when the radar device according to an embodiment of the disclosure calculates the height of the shielding object from the reference plane.

FIG. 9 is a flowchart defining another example of the operation procedure when the radar device according to an embodiment of the disclosure calculates the height of the shielding object from the reference plane. Here, a case is described where the shielding length calculating unit 61 in the radar device 300 calculates the height H2 of the shielding object from the reference plane based on a plurality of power spectra P as described in Modification 2 above.

Referring to FIG. 9, first, the operation from step S21 to step S23 is the same as the operation from step S11 to step S13 illustrated in FIG. 8, and therefore, a detailed description will not be repeated herein.

Next, based on the power spectrum P generated by the signal processor 100, the shielding length calculating unit 61 of the calculating unit 60 calculates the horizontal length of the shadow area A1 where the transmission signal is shielded by the shielding object above the reference plane, that is, the shielding length L2.

For example, if a portion exists in which the strength is lower than the threshold Th continuously over a particular span of frequency or more in the power spectrum P, the shielding length calculating unit 61 performs threshold determination configured to determine that the portion corresponds to the shadow area A1. The shielding length calculating unit 61 identifies the minimum value fa and the maximum value fb of the frequency of the portion corresponding to the shadow area A1, and calculates the shielding length L2 based on the identified minimum value fa and maximum value fb (step S24).

Next, the shielding length calculating unit 61, for example, confirms whether a particular number K1 of shielding lengths L2 have been calculated (step S25). If K1 shielding lengths L2 have not been calculated ("NO" in step S25), the shielding length L2 is not identified.

Next, an azimuth angle of a radiation direction of the transmission signal from the transmitting antenna 130 is changed (step S26), and the operation in step S21 onward is performed again.

On the other hand, if the shielding length calculating unit 61 has completed calculation of K1 shielding lengths L2 ("YES" in step S25), the shielding length calculating unit 61, for example, identifies a minimum value of the K1 shielding lengths L2 calculated as the shielding length L2 (step S27).

Next, based on the shielding length L2 identified by the shielding length calculating unit 61 and the positional relationship between the shielding object and the antenna, the vertical height calculating unit 62 in the calculating unit 60 calculates the freeboard H2 being the height of the shielding object from the reference plane (step S28), like step S17 illustrated in FIG. 8.

Next, like step S18 illustrated in FIG. 8, based on a difference between the freeboard H2 calculated by the vertical height calculating unit 62 and the height H3 of the upper deck 13 from the bottom surface of the ship 10 indicated by the dimension information stored in the storage unit 70, the draft calculating unit 63 in the calculating unit 60 calculates the draft H5 of the ship 10. The draft calculating unit 63 stores the calculated draft H5 in, for example, the storage unit 70 (step S29).

In the technology described in Patent Document 1, since the tubular body is arranged so as to surround the antenna part, the antenna part can be prevented from suffering the impact of waves and malfunctioning or being damaged.

However, since the antenna part in the water surface distance measuring instrument described in Patent Document 1 is provided to face the water surface in a position where there is a possibility of suffering the impact of waves, there remains a possibility that the antenna part may malfunction or be damaged due to the impact of waves.

A method is conceivable in which a three-dimensional radar able to swing a beam in both horizontal and vertical directions is installed in a place away from a water surface, and height information of a target or the like is obtained using the three-dimensional radar. However, such a method has a problem that the cost is increased due to increased complexity of the structure of the radar device.

A method is conceivable in which a beam is radiated in a direction oblique to a water surface from a radar device installed above the water surface, and a height of a projection on the seabed is calculated based on, for example, a length of shadow of sound waves generated behind the projection. However, in such a method, since a water depth cannot be measured, it is necessary to obtain height information of the radar device from the seabed from another apparatus able to obtain height information, such as a fish finder. Since sound waves are used, there is a problem that attenuation in the air is large.

In contrast, in the signal processor 100 according to an embodiment of the disclosure, based on the reception signal received by the antenna, the shielding length calculating unit 61 calculates the shielding length L2 which is the horizontal length of the region where the transmission signal transmitted from the antenna is shielded by the shielding object above the reference plane. Based on the shielding length L2 calculated by the shielding length calculating unit 61 and the positional relationship between the shielding object and the antenna, the vertical height calculating unit 62 calculates the height H2 of the shielding object from the reference plane.

In this way, by the configuration of obtaining height information using the horizontal length of the region shielded by the shielding object, the antenna in the radar device 300 can be installed in a place away from the reference plane such as the water surface. Since there is no need to use a three-dimensional radar, an increase in cost can be suppressed. Accordingly, a height of a target or the like can be calculated at low cost while the impact of waves is avoided.

In the signal processor 100 according to an embodiment of the disclosure, the vertical height calculating unit 62 calculates the height H2 of the shielding object from the reference plane using the height H1 of the antenna from the shielding object and the length L1 in the horizontal direction from the antenna to the end of the shielding object as the positional relationship.

In this way, by using the height H1 of the antenna from the shielding object and the length L1 in the horizontal direction from the antenna to the end of the shielding object, the height H2 of the shielding object from the reference plane can be easily calculated.

In the signal processor 100 according to an embodiment of the disclosure, the reference plane is the water surface.

By such a configuration, in the case where a shielding object exists blocking arrival of the transmission signal above the water surface, the height H2 of the shielding object from the water surface can be calculated.

In the signal processor 100 according to an embodiment of the disclosure, based on the sum of the height H2 of the shielding object from the water surface calculated by the vertical height calculating unit 62 and the height H1 of the antenna from the shielding object, the antenna height calculating unit 64 calculates the antenna height H4 which is the height of the antenna from the water surface.

In this way, by focusing on the sum of the height H2 of the shielding object from the water surface and the height H1 of the antenna from the shielding object, the antenna height H4 which is the height of the antenna from the water surface can be easily calculated.

In the signal processor 100 according to an embodiment of the disclosure, based on the antenna height H4 calculated by the antenna height calculating unit 64, the distance L3 between the antenna and a target farther from the antenna than the shielding object, and the length L4 in the horizontal direction of the region where the transmission signal is shielded by the target, the target height calculating unit 65 calculates the height H6 of the target from the water surface.

By such a configuration, the height H6 from the water surface of a target such as a fixed object such as land, a floating object on the sea, or a wave provided far from the antenna in the radar device 300 can be easily calculated.

In the signal processor 100 according to an embodiment of the disclosure, the antenna is mounted on the ship 10. The shielding object is a structure of the ship 10. The vertical height calculating unit 62 calculates the height H2 of the structure from the water surface.

By such a configuration, since the positional relationship between the shielding object and the antenna in the radar device 300 is fixed, the vertical height calculating unit 62 is able to use a known value as the positional relationship between the shielding object and the antenna. That is, without using information indicating a height or distance measured by another apparatus, the vertical height calculating unit 62 is able to calculate the height H2 of the structure from the water surface based on the reception signal received by the radar device 300 and the known value.

In the signal processor 100 according to an embodiment of the disclosure, the draft calculating unit 63 calculates the draft H5 of the ship 10 based on the difference between the height H2 of the structure from the water surface calculated by the vertical height calculating unit 62 and the height H3 of the structure from the bottom surface of the ship 10.

By such a configuration, by focusing on the difference between the height H2 of the structure of the ship 10 from the water surface and the height H3 of the structure from the bottom surface of the ship 10, the draft H5 of the ship 10 can be easily calculated.

The radar device 300 according to an embodiment of the disclosure includes: the signal processor 100; a transmitter, transmitting a transmission signal whose radiation direction is oblique to the reference plane and having a particular beam width along the radiation direction in a plane perpendicular to the reference plane; and a receiver, receiving a reception signal which is a reflection wave of the transmission signal.

By such a configuration, the height of the target or the like from the reference plane can be calculated using a nautical radar device for measuring, for example, the presence or absence of a target in the detection target area centered on the ship 10 and a distance between the ship 10 and the target.

A radar signal processing method according to an embodiment of the disclosure is a radar signal processing method in the signal processor 100. In the radar signal processing method, first, the shielding length calculating unit 61 calculates, based on the reception signal received by the antenna, the shielding length L2 which is the horizontal length of the region where the transmission signal transmitted from the antenna is shielded by the shielding object above the reference plane. Next, based on the shielding length L2 calculated by the shielding length calculating unit 61 and the positional relationship between the shielding object and the antenna, the vertical height calculating unit 62 calculates the height H2 of the shielding object from the reference plane.

In this way, by the method for obtaining height information using the horizontal length of the region shielded by the shielding object, the antenna in the radar device 300 can be installed in a place away from the reference plane such as the water surface. Since there is no need to use a three-dimensional radar, an increase in cost can be suppressed. Accordingly, a height of a target or the like can be calculated at low cost while the impact of waves is avoided.

The above embodiments are examples in all aspects and should not be interpreted as limitations. The scope of the disclosure is defined by claims instead of the above descriptions, and it is intended to include all modifications within the scope of the claims and the equivalents thereof.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A radar signal processing device, mounted on a ship together with an antenna, comprising:
    processing circuitry configured to:
        calculate a shielding length which is a horizontal length of a region where a transmission signal transmitted from the antenna is shielded by a shielding object above a reference plane based on a reflection signal reflected by a target in a target area after the transmission signal is transmitted to the target area through the antenna with a radiation direction of the transmission signal oblique to the reference plane; and
        calculate a height of the shielding object from the reference plane based on the shielding length and a positional relationship between the shielding object and the antenna.

2. The radar signal processing device according to claim 1,
    wherein the processing circuitry is further configured to:
        calculate the height of the shielding object from the reference plane using a height of the antenna from the shielding object and a horizontal length from the antenna to an end of the shielding object as the positional relationship.

3. The radar signal processing device according to claim 1, wherein
    the reference plane is a water surface.

4. The radar signal processing device according to claim 3, wherein
    the processing circuitry is further configured to:
        calculate an antenna height which is a height of the antenna from the water surface based on a sum of the height of the shielding object from the water surface and the height of the antenna from the shielding object.

5. The radar signal processing device according to claim 4, wherein
    the processing circuitry is further configured to:
        calculate a height of the target farther from the antenna than the shielding object from the water surface based on the antenna height, a distance between the antenna and the target, and a horizontal length of a region where the transmission signal is shielded by the target.

6. The radar signal processing device according to claim 3, wherein
    the shielding object is a structure of the ship; and wherein
        the processing circuitry is further configured to:
        calculate the height of the structure from the water surface.

7. The radar signal processing device according to claim 6, wherein
    the processing circuitry is further configured to:
        calculate draft of the ship based on a difference between the height of the structure from the water surface and a height of the structure from a bottom surface of the ship.

8. A radar device, comprising:
the radar signal processing device according to claim 1;
a transmitter configured to transmit the transmission signal with the radiation direction of the transmission signal oblique to the reference plane; and
a receiver configured to receive the reflection signal based on a reflection wave of the transmission signal.

9. The radar device according to claim 8, wherein
the transmitter transmits the transmission signal having a particular beam width along the radiation direction in a plane perpendicular to the reference plane.

10. The radar signal processing device according to claim 2, wherein
the reference plane is a water surface.

11. The radar signal processing device according to claim 10, wherein
the processing circuitry is further configured to:
calculate an antenna height which is a height of the antenna from the water surface based on a sum of the height of the shielding object from the water surface and the height of the antenna from the shielding object.

12. The radar signal processing device according to claim 11, wherein
the processing circuitry is further configured to:
calculate a height of the target farther from the antenna than the shielding object from the water surface based on the antenna height, a distance between the antenna and the target, and a horizontal length of a region where the transmission signal is shielded by the target.

13. The radar signal processing device according to claim 10, wherein
the shielding object is a structure of the ship; and wherein
the processing circuitry is further configured to:
calculate the height of the structure from the water surface.

14. The radar signal processing device according to claim 13, wherein
the processing circuitry is further configured to:
calculate draft of the ship based on a difference between the height of the structure from the water surface and a height of the structure from a bottom surface of the ship.

15. A radar device, comprising:
the radar signal processing device according to claim 14;
a transmitter configured to transmit the transmission signal with the radiation direction of the transmission signal oblique to the reference plane; and
a receiver configured to receive the reflection signal based on a reflection wave of the transmission signal.

16. The radar device according to claim 15, wherein
the transmitter transmits the transmission signal having a particular beam width along the radiation direction in a plane perpendicular to the reference plane.

17. A radar device, comprising:
the radar signal processing device according to claim 12;
a transmitter configured to transmit the transmission signal with the radiation direction of the transmission signal oblique to the reference plane; and
a receiver configured to receive the reflection signal based on a reflection wave of the transmission signal.

18. The radar device according to claim 17, wherein
the transmitter transmits the transmission signal having a particular beam width along the radiation direction in a plane perpendicular to the reference plane.

19. A radar signal processing method in a radar signal processing device mounted on a ship together with an antenna, comprising:
calculating a shielding length which is a horizontal length of a region where a transmission signal transmitted from the antenna is shielded by a shielding object above a reference plane based on a reflection signal reflected by a target in a target area after the transmission signal is transmitted to the target area through the antenna with a radiation direction of the transmission signal oblique to the reference plane; and
calculating a height of the shielding object from the reference plane based on the shielding length and a positional relationship between the shielding object and the antenna.

20. A non-transitory computer-readable medium, storing a radar signal processing program used in a radar signal processing device mounted on a ship together with an antenna, the radar signal processing program causing a computer to execute processing configured to:
calculate shielding length which is a horizontal length of a region where a transmission signal transmitted from the antenna is shielded by a shielding object above a reference plane based on a reflection signal reflected by a target in a target area after the transmission signal is transmitted to the target area through the antenna with a radiation direction of the transmission signal oblique to the reference plane; and
calculate a height of the shielding object from the reference plane based on the shielding length and a positional relationship between the shielding object and the antenna.

* * * * *